(12) United States Patent  
O'Meara, Jr.

(10) Patent No.: US 7,054,749 B1
(45) Date of Patent: May 30, 2006

(54) METHOD FOR DETERMINING RESERVOIR FLUID VOLUMES, FLUID CONTACTS, COMPARTMENTALIZATION, AND PERMEABILITY IN GEOLOGICAL SUBSURFACE MODELS

(76) Inventor: Daniel J. O'Meara, Jr., 7 Sable Valley, San Antonio, TX (US) 78258

( * ) Notice: Subject to any disclaimer, the term of this patent is extended or adjusted under 35 U.S.C. 154(b) by 245 days.

(21) Appl. No.: 10/740,867

(22) Filed: Dec. 19, 2003

Related U.S. Application Data

(63) Continuation-in-part of application No. 09/990,988, filed on Nov. 13, 2001, now Pat. No. 6,792,354.

(60) Provisional application No. 60/248,047, filed on Nov. 13, 2000.

(51) Int. Cl.
*G06F 19/00* (2006.01)

(52) U.S. Cl. .................................. 702/6; 702/13
(58) Field of Classification Search .................. 702/2, 702/6–9, 11, 12, 13, 14; 703/2, 10; 324/303; 73/152.51, 152.52, 152.53, 152.55
See application file for complete search history.

(56) References Cited

U.S. PATENT DOCUMENTS

| | | | |
|---|---|---|---|
| 4,646,240 A | 2/1987 | Serra et al. | 364/422 |
| 4,648,261 A | 3/1987 | Thompson et al. | 73/38 |
| 4,991,095 A | 2/1991 | Swanson | 364/421 |
| 5,193,059 A | 3/1993 | Tiab et al. | 364/422 |
| 5,416,750 A | 5/1995 | Doyen et al. | 367/73 |
| 5,621,169 A | 4/1997 | Harris et al. | 73/152.18 |
| 5,995,906 A | 11/1999 | Doyen et al. | 702/16 |
| 6,044,328 A | 3/2000 | Murphy et al. | 702/11 |
| 6,484,102 B1 | 11/2002 | Holmes | 702/6 |

*Primary Examiner*—Donald McElheny, Jr.
(74) *Attorney, Agent, or Firm*—Martin G. Ozinga; Phillips McFall McCaffrey McVay & Murrah, P.C.

(57) ABSTRACT

The present invention is a method for using petrophysical data from a plurality of wells, in a plurality of reservoir regions, containing a plurality of reservoir rock types, in the context of a three-dimensional geological model, for identifying dimensionless capillary pressure functions and using these dimensionless capillary pressure functions for determining reservoir fluid volumes, fluid contacts, the extent of reservoir compartmentalization, and an improved estimate of reservoir permeability. The present invention is directed to the method and finished product of same.

7 Claims, 11 Drawing Sheets
(9 of 11 Drawing Sheet(s) Filed in Color)

METHOD FOR DETERMINING RESERVOIR FLUID VOLUMES, FLUID CONTACTS, COMPARTMENTALIZATION, AND PERMEABILITY IN GEOLOGICAL SUBSURFACE MODELS

CROSS-REFERENCE TO RELATED APPLICATIONS

The present application is a continuation-in-part of U.S. patent application Ser. No. 09/990,988 filed Nov. 13, 2001, U.S. Pat. No. 6,792,354, in which priority is claimed from U.S. provisional patent application Ser. No. 60/248,047, filed on Nov. 13, 2000. The entire content of each of the above-referenced applications is hereby expressly incorporated herein by reference.

BACKGROUND OF THE INVENTION

1. Field of the Invention

The present invention relates to a method to determine quantity, distribution, and speed of recovery of hydrocarbons in oil and gas subterranean reservoirs. More particularly, the present invention is a method for using petrophysical data from a plurality of wells, in a plurality of reservoir regions, containing a plurality of reservoir rock types, in the context of a three dimensional geological model, for identifying dimensionless capillary pressure functions (DCPF) and using these dimensionless capillary pressure functions for determining reservoir fluid volumes, fluid contacts, the extent of reservoir compartmentalization, and an improved estimate of reservoir permeability.

Aspects of the present invention draw from the fields of geology, geophysics, petrophysics, petroleum engineering, and applied mathematics. The present invention relates to methods for assisting engineers, geologists, and others to address the following key issues in the development of oil and gas reservoirs: the calculation of the distribution and volume of hydrocarbons in place, the degree to which reservoir fluids are contained in isolated flow compartments, and the speed with which fluids may be recovered. The first issue concerns the concepts of porosity and fluid saturations, which are, respectively, the fraction of the rock volume available for reservoir fluids and the fraction of the pore space containing a particular fluid. The second issue concerns the concept of reservoir compartmentalization, the degree to which reservoir fluids flow in isolated flow units. The third issue concerns the concept of permeability, a parameter that relates fluid flow rates to imposed pressure gradients, which can be due to injection of fluids or to natural conditions such as aquifers or gas caps. The present invention relates to a method for using dimensionless capillary pressure functions as derived from well logs to calculate saturations and fluid contacts, identify reservoir compartments, and improve on estimates of permeability in three-dimensional geological models.

2. Prior Art.

In general, the present invention is a method for assisting engineers, geologists, and others associated with the development of oil and gas subterranean reservoirs to address questions concerning how much hydrocarbons are in a given location, how they are distributed within that location, and how fast can they be recovered from this given location. The present invention helps to address all three of these questions whereas the prior art has known disadvantages.

It is well known that reservoir fluids are distributed according to the interplay of gravitational and capillary forces. Capillary pressure curves, which describe capillary forces, are typically measured in laboratory experiments. In one such type of an experiment, a completely water-saturated rock is exposed to oil. Typically, in the case of water-wet rock, oil does not enter the pore space of the rock until a certain pressure, referred to as the displacement pressure or entry pressure, is exceeded. As the oil pressure is increased above the entry pressure, more and more oil enters the pore space and a corresponding amount of water leaves the pore space. As pressure continues to increase, it becomes increasingly difficult to remove water: there is proportionately less and less water leaving the rock. Eventually, at high oil pressures, a low saturation of water remains. This water saturation is referred to as the irreducible water saturation. The shape of the capillary pressure curve is an indicator of the distribution of the sizes of the pores within the porous media. Thus, rocks of various porosities and permeabilities exhibit widely varying capillary pressure curves. Thus, capillary pressure curves are used to characterize reservoir rocks.

Reservoirs contain various compositions of oil, water, and gas that are distributed within heterogeneous rocks, exhibiting a high degree of variability in porosity and permeability. For example, if the reservoir were deposited within a fluvial (relating to ancient rivers or channels) environment, there is typically a high degree of heterogeneity, both in an inter-channel and intra-channel areas. On the larger, inter-channel scale, the channels would exhibit high permeabilities; whereas, intervening flood plain deposits would be of lower permeabilities, and intervening shales would exhibit little or no permeability. On the intra-channel scale, one might encounter highly heterogeneous porosities and permeabilities in mud clast rocks at the base of a channel (where the ancient rates of sediment transport were highest). Higher up in a given channel, one might encounter plane and cross-bedded rocks exhibiting high permeabilities. These might grade up into finely sorted ripple laminated facies exhibiting uniform, but lower, permeabilities. Heterogeneous reservoirs, whether they are comprised of sandstones, carbonates, or other types of rocks are the norm.

In general, two rock samples from the same reservoir will have different capillary pressure curves when their permeabilities and/or porosities are different. Consequently, given the typical high degree of reservoir heterogeneity, a representative characterization of reservoirs using capillary pressure curves is likely to be an arduous task. Complex geological models containing in excess of a million cells can, in principle, require millions of measurements to describe the necessary capillary pressure curves.

More than fifty years ago, Leverett identified a way around this problem by proposing a dimensionless capillary pressure curve called the J Function, $$J(S_w) = \frac{P_c\sqrt{k|\phi}}{\sigma\cos\theta}$$

See Leverett, M.C., "Capillary Behavior in Porous Solids", Transactions of the AIME 142, 152–169 (1941). In this equation, $S_w$ denotes water saturation; $P_c$, capillary pressure; k, permeability; $\phi$, porosity; $\sigma$, interfacial tension; and $\theta$, contact angle. Upon analyzing experimental data, Leverett discovered that many rock samples, within a certain rock type or classification, exhibited one characteristic curve instead of multiple capillary pressure curves. Thus, the advantage of his approach is that many rock samples exhibiting various porosities and permeabilities are, within a particular rock type, classifiable by a single curve. Consequently, the problem of describing millions of capillary pressure curves for a geological model can be reduced to using a manageable number of Leverett J Functions. Typically, Leverett J Functions are correlated with parameters such as lithology, shale volume, and reservoir zone.

The present invention generalizes the equation of the Leverett J Function into a function that is, heretofore, referred to as the dimensionless capillary pressure function. It is defined as follows:

$$J(S_w) = \frac{P_c \sqrt{k}}{\sigma \cos\theta} f(\phi)$$

Like Leverett's J Function, this new function is dimensionless. In this equation, f denotes a function of porosity, thus generalizing the dependence on porosity and reducing to Leverett's result when the function f is the reciprocal of the square root. Leverett defined the function as $\phi^{-n}$ where $n=\frac{1}{2}$ as is depicted in the previous formula. It is contemplated that the variable n may be any other positive number as depicted.

There are known expensive and time consuming methods which attempt to determine aspects of subterranean formations for evaluation of oil and gas recovery with various application identifying dimensionless capillary pressure functions from laboratory measurements on core samples. The latter refers to small segments of reservoir rock that are recovered from wells. Oftentimes, due to the additional costs of coring operations, core samples are not recovered from many oil and gas wells. Typically, when they are recovered, they represent a sparse sampling of reservoir rocks within a well. Consequently, dimensionless capillary pressure functions obtained from laboratory measurements on core samples may poorly represent the heterogeneity of the reservoirs of interest. The present invention determines dimensionless capillary pressure functions from well logs. Consequently, in comparison to laboratory determinations, the present invention more broadly samples reservoir heterogeneities, as exhibited in wells. Moreover, the present invention places such information gained at the wells in context with a geological model of reservoir and fluid properties, thus leading to its more effective use in calculating the distribution and volume of hydrocarbons in place, the degree to which reservoir fluids are contained in isolated flow compartments, and the speed with which fluids may be recovered.

Throughout the oil and gas industry, computer models of reservoir and fluid properties are used to assess the amounts and distributions of recoverable hydrocarbons and to forecast their production. Increasingly, integrated, interdisciplinary teams of geologists, petrophysicists, petroleum engineers, geophysicists, and other reservoir scientists and engineers construct such computer models. In fact, these models are often used as repositories of diverse and heterogeneous types of reservoir data that are acquired by the various members of the team.

Typically, these models contain measured data from borehole or surface geophysical measurements. Borehole measurements are of high resolution (less than one foot) but pertain to a very limited portion of the entire model, thus leaving the interdisciplinary team to grapple with issues of how properly to interpolate or distribute borehole measurements into the full expanse of the interwell region within the three-dimensional model. Surface measurements sample a far larger portion of the model than boreholes, but at far lower resolution (up to hundreds of feet), thus providing the team with only limited guidance on the issue of interpolating or distributing properties from the boreholes.

In recent years, great attention and many technical papers have focused on the issues of building such models and of distributing various properties within them. Typically, these methods entail distributing properties such as lithology, porosity, permeability, seismic impedance, etc. Such methods tend to focus on the sensible distribution of properties with reference to a geostatistical or geological (both structural and stratigraphic) framework. Notably absent from these methods is a method for the systematic and rigorous distribution of fluid saturation information from well logs into the three-dimensional region between wells. As opposed to other reservoir properties, fluid saturations are not merely dependent on the geostatistical or geological frameworks but must conform to well-understood principles of capillarity, which govern their distributions with regards to, say, porosity and permeability. The present method honors (indeed can reproduce exactly) all saturation data within wells while distributing saturations between wells according to well-established principles of capillarity.

A number of prior-art patents address the issues of geological modeling, in general, and the geostatistical distribution of properties within a model. U.S. Pat. No. 4,646,240, entitled METHOD AND APPARATUS FOR DETERMINING GEOLOGICAL FACIES issued to Serra et al., describes a technique for automatically determining lithological facies from well-log data.

U.S. Pat. No. 4,991,095, entitled PROCESS FOR THREE-DIMENSIONAL MATHEMATICAL MODELING OF UNDERGROUND VOLUMES issued to Swanson, describes a technique for subsurface modeling utilizing a regular grid in the longitude-latitude plane and arbitrary resolution in the depth direction.

U.S. Pat. No. 5,416,750, entitled BAYESIAN SEQUENTIAL INDICATOR SIMULATION OF LITHOLOGY FROM SEISMIC DATA issued to Doyen et al., describes a geostatistical method for distributing lithology data into a three-dimensional geological model.

U.S. Pat. No. 5,995,906, entitled METHOD FOR RECONCILING DATA AT SEISMIC AND WELL-LOG SCALES IN 3-D EARTH MODELING issued to Doyen et al. describes a geostatistical method for reconciling the disparity in scale between vertically detailed log measurements of a selected rock property in boreholes and vertically-averaged measurements of the same rock property as derived from seismic observations over a region of interest.

U.S. Pat. No. 6,044,328, entitled METHOD FOR CREATING, TESTING, AND MODIFYING GEOLOGICAL SUBSURFACE MODELS issued to Murphy et al., describes a computer-implemented method for managing geological hypotheses and constructing geological models with reference to a known archive of geological structures.

On the one hand, prior-art methods for distributing properties between wells prove inappropriate for calculating fluid saturations because of inattention to principles of capillarity. On the other hand, prior-art methods for interpreting well log data to determine, say, formation boundaries, oil-water contacts, or hydraulic flow units rely on a restrictive set of equations and/or provide no methodology for distributing saturations into the three-dimensional model while honoring well log data. Moreover, prior-art methods for interpreting well log data tend not to incorporate geological information that has, through the above-mentioned geological modeling methods, been distributed within the three-dimensional geological model. In counter distinction, the present method uses information such as reservoir zone, fault block, lithology, etc. (that are usually found in three-dimensional reservoir geological models) to aid the interpretation of well log data.

A number of prior-art patents address the issues of determining formation boundaries, flow units, or oil-water contacts from well log data. U.S. Pat. No. 4,648,268, entitled METHOD OF DEFINING HOMOGENEOUS ROCK FORMATION ZONES ALONG A BOREHOLE ON THE BASIS OF LOGS issued to Grosjean, describes a method for processing well-log data to define formation boundaries along the borehole.

U.S. Pat. No. 5,193,059, entitled METHOD FOR IDENTIFYING AND CHARACTERIZING HYDRAULIC UNITS OF SATURATED POROUS MEDIA: TRI-KAPPA ZONING PROCESS issued to Tiab et al., describes a method for defining formation units of similar hydraulic characteristics by means of core measurements and for relating the hydraulic characteristics of such units to macroscopic measurements of the formation as provided by wireline logs.

U.S. Pat. No. 5,621,169, entitled METHOD FOR DETERMINING HYDROCARBON/WATER CONTACT LEVEL FOR OIL AND GAS WELLS issued to Harris et al., describes a method for predicting the hydrocarbon/water contact level for oil and gas wells that relates porosity, water saturation, air permeability, and capillary pressure. The method relies on a worldwide correlation of permeability and porosity to a function of capillary pressure.

None of the prior-art approaches, either individually or collectively, address the need for a method for distributing saturations into a three-dimensional geological model whereby the saturation distribution honors both well-established principles of capillarity as well as the measured saturations within boreholes. The present invention, as described below, addresses these and other needs.

SUMMARY OF THE INVENTION

In general, the present invention is a method for using petrophysical data from a plurality of wells, in a plurality of reservoir regions, containing a plurality of reservoir rock types, in the context of a three-dimensional geological model, for identifying dimensionless capillary pressure functions and using these dimensionless capillary pressure functions for determining reservoir fluid volumes, fluid contacts, the extent of reservoir compartmentalization, and an improved estimate of reservoir permeability.

The present invention is a method for predicting equilibrium oil, water, and gas saturations within a three-dimensional geological model of a hydrocarbon reservoir and, in particular, predicting the fluid contacts through use of well dimensionless capillary pressure functions, such that well-established principles of capillarity are honored and well log measurements of saturation are recovered exactly. Furthermore, the method improves upon permeability estimates and identifies separate flow compartments within the reservoir model through differences in free water elevations. Well log data are interpreted within the context of a geological model. The resulting three-dimensional saturation distributions are consistent with the porosity, permeability, and fluid property distributions. The method is improved by, but does not depend upon, measurements of capillary pressures, porosity-permeability correlations, fluid properties, or reservoir pressures.

In this respect, before explaining at least one embodiment of the invention in detail, it is to be understood that the invention is not limited in this application to the details of construction and to the arrangement so the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods and systems for carrying out the several purposes of the present invention. It is important, therefore that the claims be regarded as including such equivalent constructions insofar as they do not depart from the spirit and scope of the present invention.

Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved method for determining quantity, distribution, and speed of recovery of hydrocarbons in subterranean formations such as oil and gas reservoirs. To wit, it is an object of the present invention to predict the equilibrium oil, water, and gas saturations within a three-dimensional geological model of a hydrocarbon reservoir and, in particular, to predict the fluid contacts (oil/water and gas/oil contacts in an oil-water-gas reservoir, gas/oil contacts in a gas reservoir, and oil/water contacts in an oil-water reservoir), through use of well dimensionless capillary pressure functions such that well-established principles of capillarity are honored and well log measurements of saturation are recovered exactly.

It is a further object of the present invention to provide a new and improved method that identifies dimensionless capillary pressure functions.

An even further object of the present invention is to provide a new and improved method that produces reliable and consistent data for use in the recovery of hydrocarbons in the petroleum industry.

Still another object of the present invention to provide a new and improved method that is susceptible of a low cost of manufacture thereby making such economically available to the industry in need.

Another object of the present invention is to provide a new and improved method that provides some of the advantages of the prior art, while simultaneously overcoming some of the disadvantages normally associated therewith.

Yet another object of the present invention is to provide a new and improved method susceptible to implementation in the field by easy to use software for computers and computer-implemented methods for identifying dimensionless capillary pressure functions.

A further object of the present invention is to improve upon permeability estimates obtained from either core or log measurements.

Still yet another further object of the present invention is to identify separate flow compartments within the reservoir model through differences in free water elevations.

These together with other objects of the invention, along with the various features of novelty that characterize the invention, are pointed out with particularity in the claims annexed to and forming a part of this disclosure. For a better understanding of the invention, its operating advantages and the specific objects attained by its uses, reference would be had to the accompanying drawings, attachments, charts, depictions and descriptive matter in which there is illustrated preferred embodiments and results of the invention.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION OF THE PREFERRED EMBODIMENTS

The current invention is a method for using petrophysical data from a plurality of wells, in a plurality of reservoir regions, containing a plurality of reservoir rock types, in the context of a three-dimensional geological model, for identifying dimensionless capillary pressure functions and using these dimensionless capillary pressure functions for determining reservoir fluid volumes, fluid contacts, the extent of reservoir compartmentalization, and an improved estimate of reservoir permeability.

The invention is described with reference to a presently preferred embodiment in a computer-implemented system sold under the trademark Geo2Flow. It includes a plurality of instructions, embodied in a computer-readable medium (including, without limitation, RAM, ROM, or other solid-state media, and/or magnetic, magneto-optical, or optical devices), which cause a computer (of any sort, including, without limitation, palm-top devices, personal computers, engineering workstations, mini-computers, mainframe computers, and super-computers) to process data representative of geological, geophysical, and/or engineering phenomena in accordance with the invention.

The present invention is an interactive system, designed to assist the reservoir asset management team (which may include, without limitation, geologists, geophysicists, petrophysicists, and engineers) in interpreting reservoir and laboratory data in the context of a geological model and in facilitating the calculation of dimensionless capillary pressure functions; logs of J facies, permeability, and irreducible saturation; three-dimensional saturation distributions and fluid contacts.

The method or workflow for a preferred embodiment of the present invention is now generally described. With few exceptions, there is no particular requirement that various elements of the method or workflow be entered in any particular order. Such exceptions, such as that well data would have to be imported before using it, would be obvious to those skilled in the art.

EXAMPLE

A preferred embodiment of the current invention essentially comprises the following steps, method, or workflow:

Define the geological model to be used. This pre-supposes that a geological model, albeit rudimentary, which describes petrophysical, geological, geophysical, and engineering properties has already been construct.

Describe the units of measurement. This is a simple step, but a necessary one because engineers and geoscientists do not always use the same units of measurement.

Describe the phase system: oil-water-gas, oil-water, or gas-water.

Determine whether to limit the current investigation to a certain portion of the geological model.

Choose the wells to be analyzed. These would be wells containing equilibrium logs, not affected by substantial, later flows in the reservoir.

Describe the PVT (pressure, volume, temperature) fluid properties of oil, water, and gas.

Describe PVT profiles, where a single reservoir compartment exhibits more than one PVT behavior.

Describe interfacial properties: interfacial tension and contact angles.

Import well logs. This must include logs of porosity and water saturation, as well as zone and fault block logs. Optional logs include permeability and "indicators", such as lithology, shale volume, etc. that may prove useful in identifying various dimensionless capillary pressure functions.

Analyze and fit porosity-permeability data, either core or log derived.

Figure 1A:
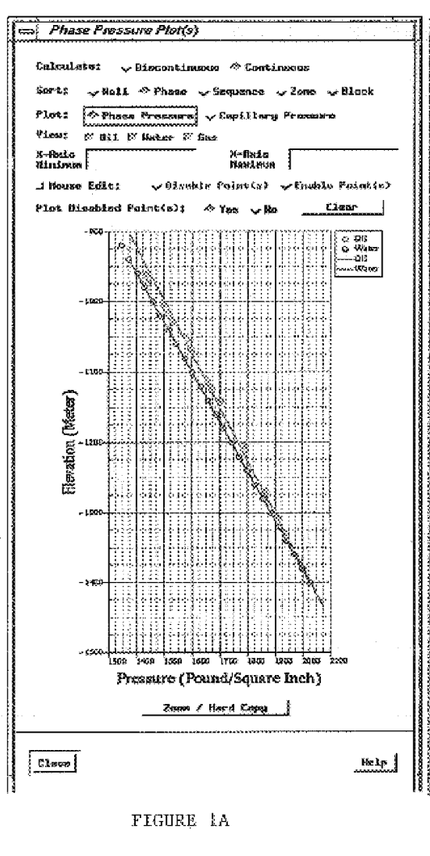
FIG. 1A is a color chart/depiction showing oil and water pressures as a function of elevation in accordance with the present invention.
Figure 1B:
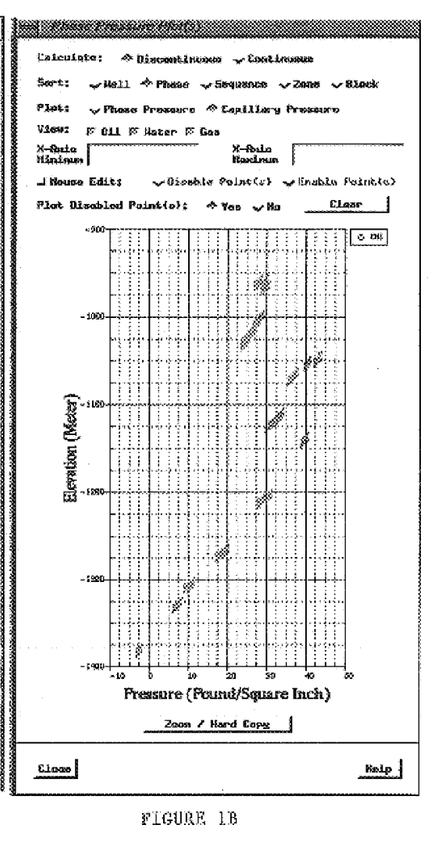
FIG. 1B is a color chart/depiction showing capillary pressure as a function of elevation in accordance with the present invention.

When data are available, import reservoir pressures as a function of location and phase (oil, water, gas). See, for example, FIG. 1A. Associate such pressures with geological parameters such as reservoir zone and fault block. Subtract off water pressure baseline, if appropriate, to calculate capillary pressure as a function of elevation. See, for example, FIG. 1B. Estimate free water elevations, for which the capillary pressure is zero. Limit PVT profiles and/or properties to those that obtain good fits of the pressure data.

Figure 2:
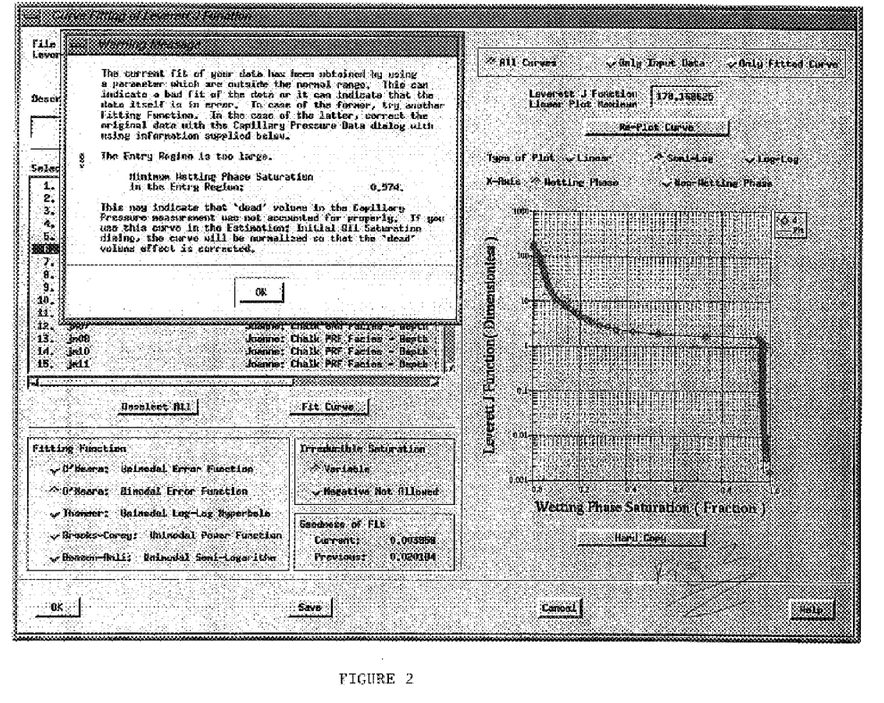
FIG. 2 is a color chart/depiction showing fitting of dimensionless capillary pressure function from laboratory measured capillary pressure data in accordance with the present invention.

When data are available from laboratory measurements of capillary pressure on core samples, build up a catalog of dimensionless capillary pressure functions. See, for example, FIG. 2. In this step, parametric fits of core measurements of capillary pressure are obtained as a function of, but not limited to, lithology, shale volume, reservoir zone, etc, with the process of parametrically fitting curves essentially comprising:

Assembling capillary pressure measurements on a multiplicity of core samples.

Calculating the dimensionless capillary pressure function from the capillary pressure measurements.

Fitting the dimensionless capillary pressure function data using a plurality of fitting functions.

Using the criteria of minimizing the sum of the squares of the differences between the measurements and the fitted data to estimate parameters for the fitting functions.

Interactively modifying said fitted parameters to improve the fit of the data, where the quality of the fit is determined by visual inspection of the data and fitted function.

Figure 3:
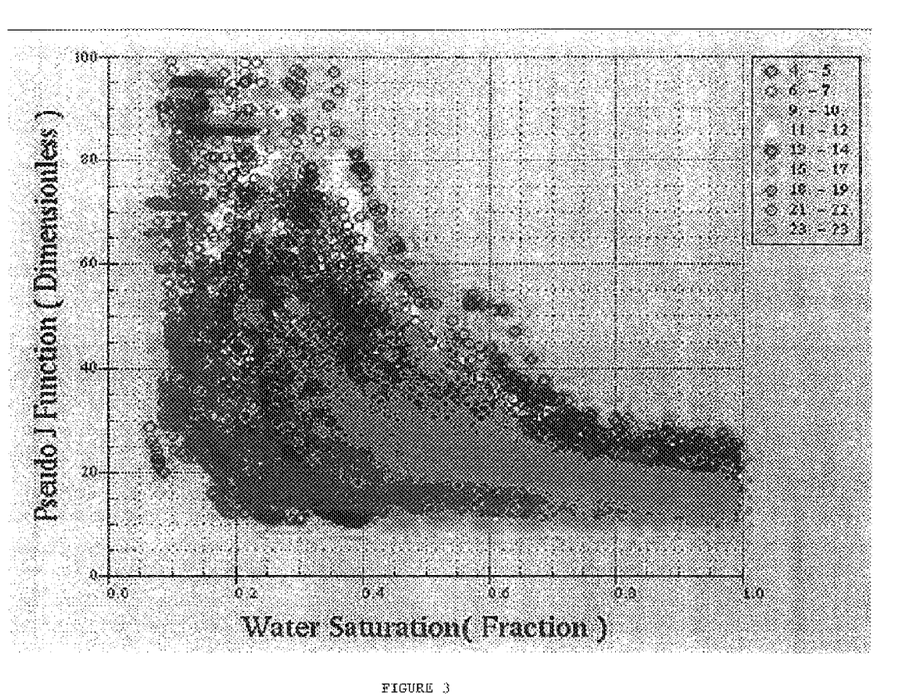
FIG. 3 is a color chart/depiction showing log-derived dimensionless capillary pressure function as a function of water saturation for a model containing twenty-three wells in accordance with the present invention.
Figure 4A:
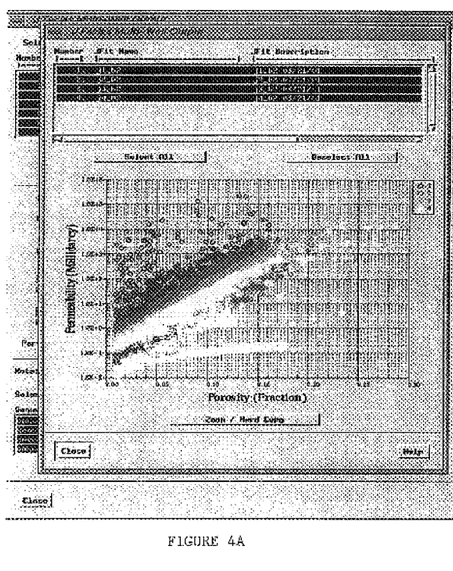
FIG. 4A is a color chart/depiction showing the calculated porosity-permeability relationship where only permeability has been used to adjust values of the dimensionless capillary pressure function in accordance with the present invention.
Figure 4B:
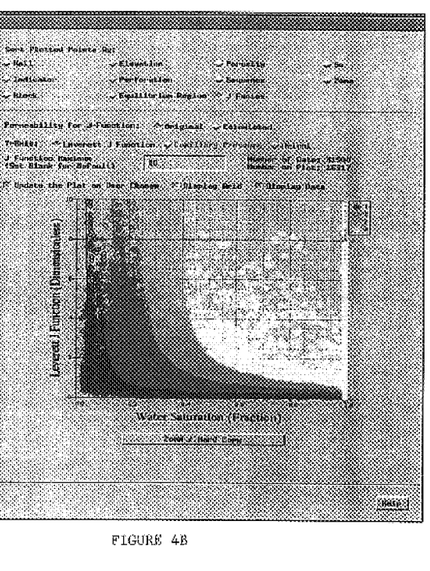
FIG. 4B is a color chart/depiction showing the calculated J facies assignments for the case where only permeability has been used to adjust values of the dimensionless capillary pressure function in accordance with the present invention.
Figure 5A:
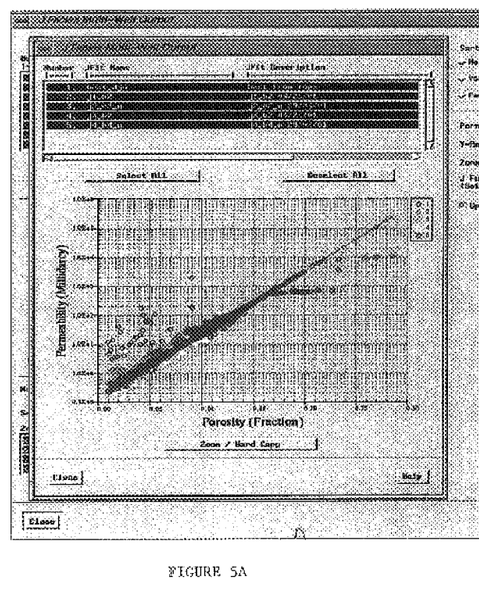
FIG. 5A is a color chart/depiction showing on the left the calculated porosity-permeability relationship where both permeability and irreducible water saturation have been used to adjust values of the dimensionless capillary pressure function in accordance with the present invention.
Figure 5B:
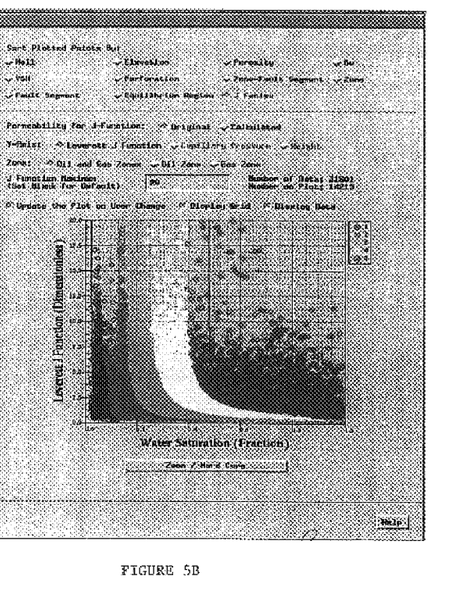
FIG. 5B is a color chart/depiction showing the calculated J facies assignments for the case where both permeability and irreducible water saturation have been used to adjust values of the dimensionless capillary pressure function in accordance with the present invention.
Figure 6A:
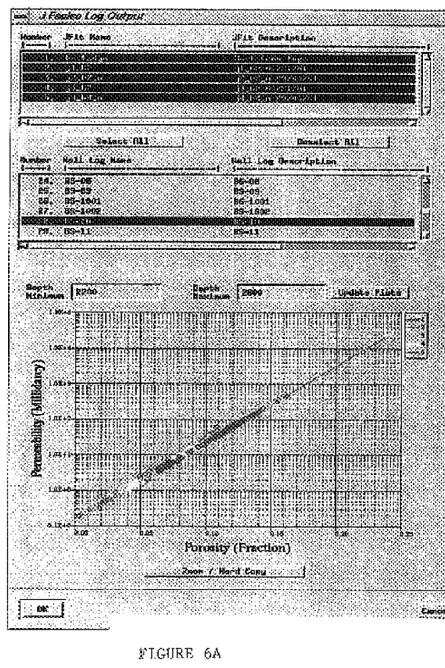
FIG. 6A is a color chart/depiction showing the calculated porosity-permeability relationship for a particular well where colors refer to J facies in accordance with the present invention.
Figure 6B:
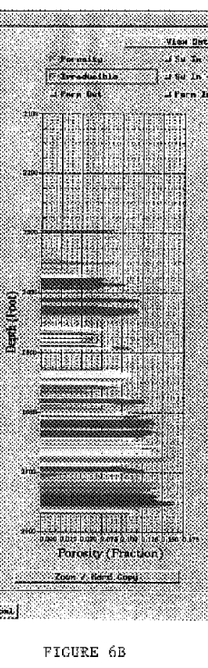
FIG. 6B is a color chart/depiction showing the well log of porosity for a particular well where colors refer to J facies in accordance with the present invention.
Figure 6C:
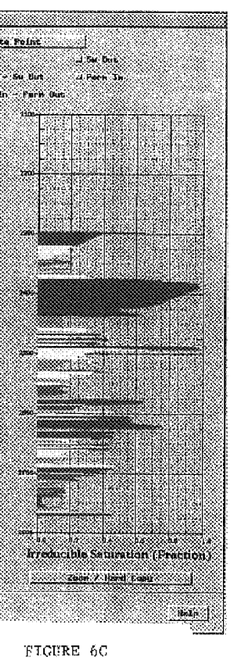
FIG. 6C is a color chart/depiction showing the calculated well log of irreducible water saturation for a particular well where colors refer to J facies in accordance with the present invention.
Figure 7A:
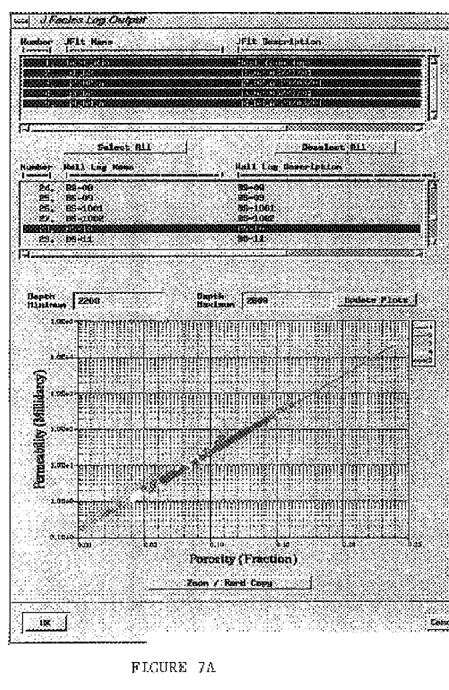
FIG. 7A is a color chart/depiction showing on the left the calculated porosity-permeability relationship for a particular well where colors refer to J facies in accordance with the present invention.
Figure 7B:
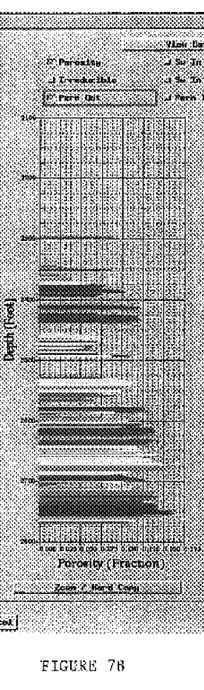
FIG. 7B is a color chart/depiction showing the well log of porosity for a particular well where colors refer to J facies in accordance with the present invention.
Figure 7C:
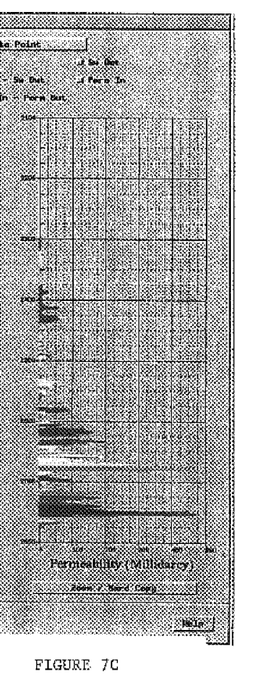
FIG. 7C is a color chart/depiction showing the calculated well log of permeability for a particular well where colors refer to J facies in accordance with the present invention.

Calculate the dimensionless capillary pressure function as a function of water saturation for all wells simultaneously. See, for example, FIG. 3. The dimensionless capillary pressure function is comprised of contributions from capillary pressure, permeability, porosity, interfacial tension, and contact angle. The capillary pressure contribution to the dimensionless capillary pressure function is determined by PVT (pressure, volume, temperature) behavior and of elevation above an assumed free water elevation. Merely for purposes of illustrating how PVT behavior, elevation, and free water elevation affect the capillary pressure, consider the calculation of capillary pressure for the simple case of a "dead" oil (no gas) and water. In this case, capillary pressure is calculated as follows:

$$P_c = \Delta \rho g(z - z_o)$$

In this equation, $P_c$ denotes capillary pressure; $\Delta \rho$ denotes density difference between the water and oil; g, the gravitational acceleration; z, elevation; and $z_o$, the free water elevation. The water saturation and porosity contributions to the Dimensionless Capillary Pressure Function are obtained from logs. The permeability contribution is obtained from estimates, porosity-permeability correlations, or a log. The contributions due to interfacial tension and contact angle are typically assumed to be dependent on PVT behavior and are likely to be constants or input as profiles. For identifying patterns, the plot of dimensionless capillary pressure function as a function of water saturation is color-coded and can be sorted (without limitation) as a function of well number, elevation, porosity, water saturation, indicator, perforation, sequence, zone, fault block, and equilibrium region.

Search for different free water elevations (evidence of compartmentalization) as a function of wells, zone, fault block, etc. When available, use reservoir pressures to constrain the search for free water elevation. Identify equilibrium regions, which are described by the combination of PVT behavior and free water elevation.

Identify one or more characteristic dimensionless capillary pressure functions from the well log data by filtering plots of the dimensionless capillary pressure function to highlight or accentuate characteristic dimensionless capillary pressure function shapes. A characteristic dimensionless capillary pressure functions is described, heretofore, as a J facies. When available, use core-derived, parametric fits of dimensionless capillary pressure functions to guide the identification of such functions.

Assign one of the characteristic dimensionless capillary pressure functions to every data point in the well logs for which the water saturation is less than one hundred percent (or within some tolerance of one hundred percent). Choose relative weighting of the error in permeability and irreducible water saturation and assign each data point to a characteristic function. Minimize the vertical distance on the plot of dimensionless capillary pressure functions versus water saturation by adjusting the permeability. Minimize the horizontal distance on the plot of dimensionless capillary pressure functions versus. water saturation by adjusting the irreducible water saturation. Create a scatter-plot of both permeability and irreducible water saturation as a function of porosity for each characteristic dimensionless capillary pressure function. See, for example, FIGS. 4A, 4B, 5A and 5B.

For all wells, create new logs of J facies, permeability, and irreducible water saturation. See, for example, FIGS. 6A–6C and 7A–7C.

Use any one of many existing methods for interpolating or geostatistically distributing porosity, characteristic dimensionless capillary pressure function (J facies), permeability, and irreducible water saturation into the three-dimensional geological model, where permeability and irreducible saturation may be distributed within the three-dimensional according to the distribution of characteristic dimensionless capillary pressure function (or J facies).

Figure 8:
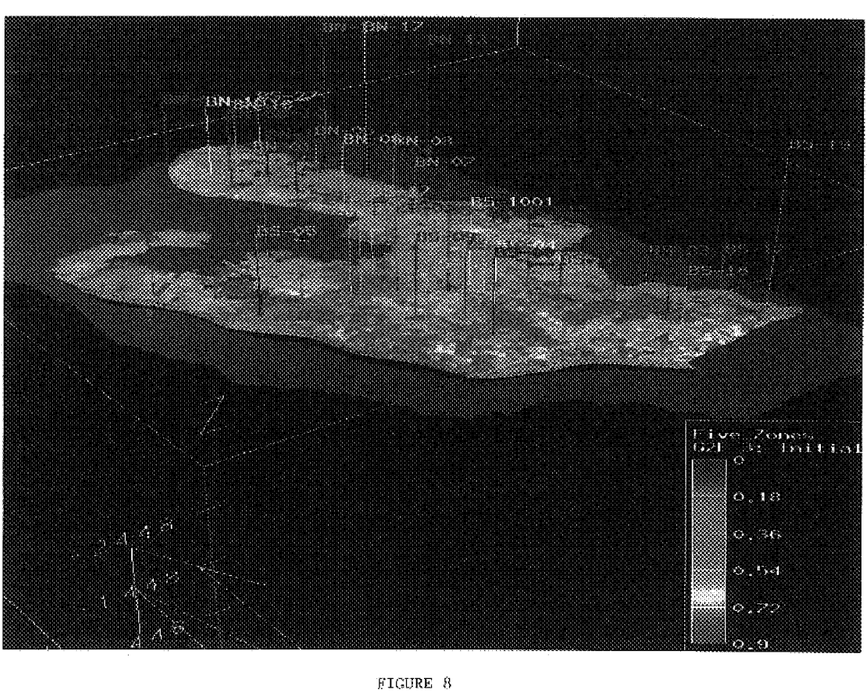
FIG. 8 is a color chart/depiction showing three-dimensional oil saturation (high oil saturations in red, low in blue) in accordance with the present invention.

From the three-dimensional distributions of porosity, characteristic dimensionless capillary pressure function, permeability, and irreducible water saturation calculate the hydrocarbon and water saturations. See, for example, FIG. 8.

Figure 9:
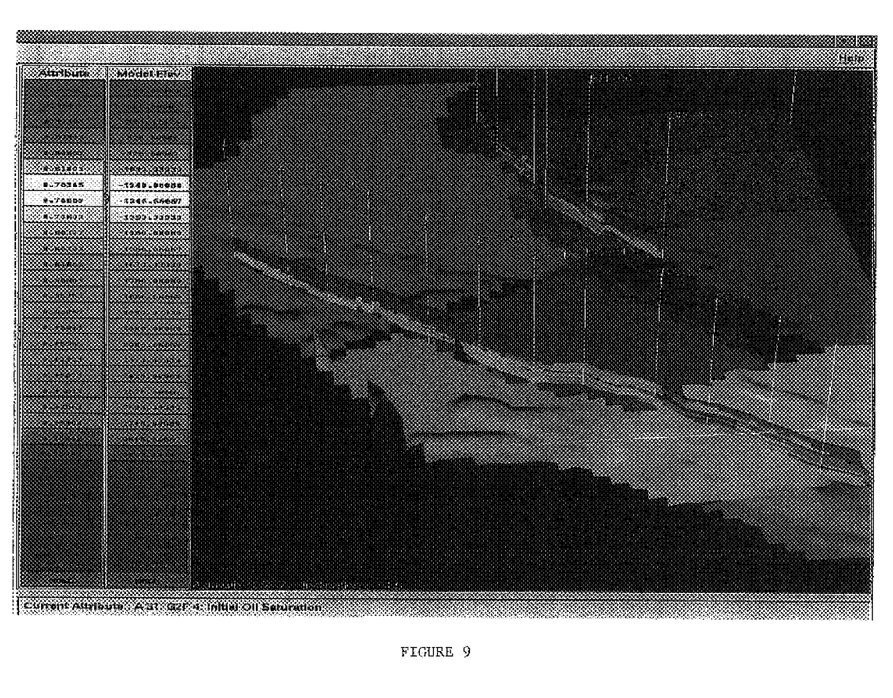
FIG. 9 is a color chart/depiction showing nine calculated oil-water contacts (colored surfaces) in accordance with the present invention.
Figure 10:
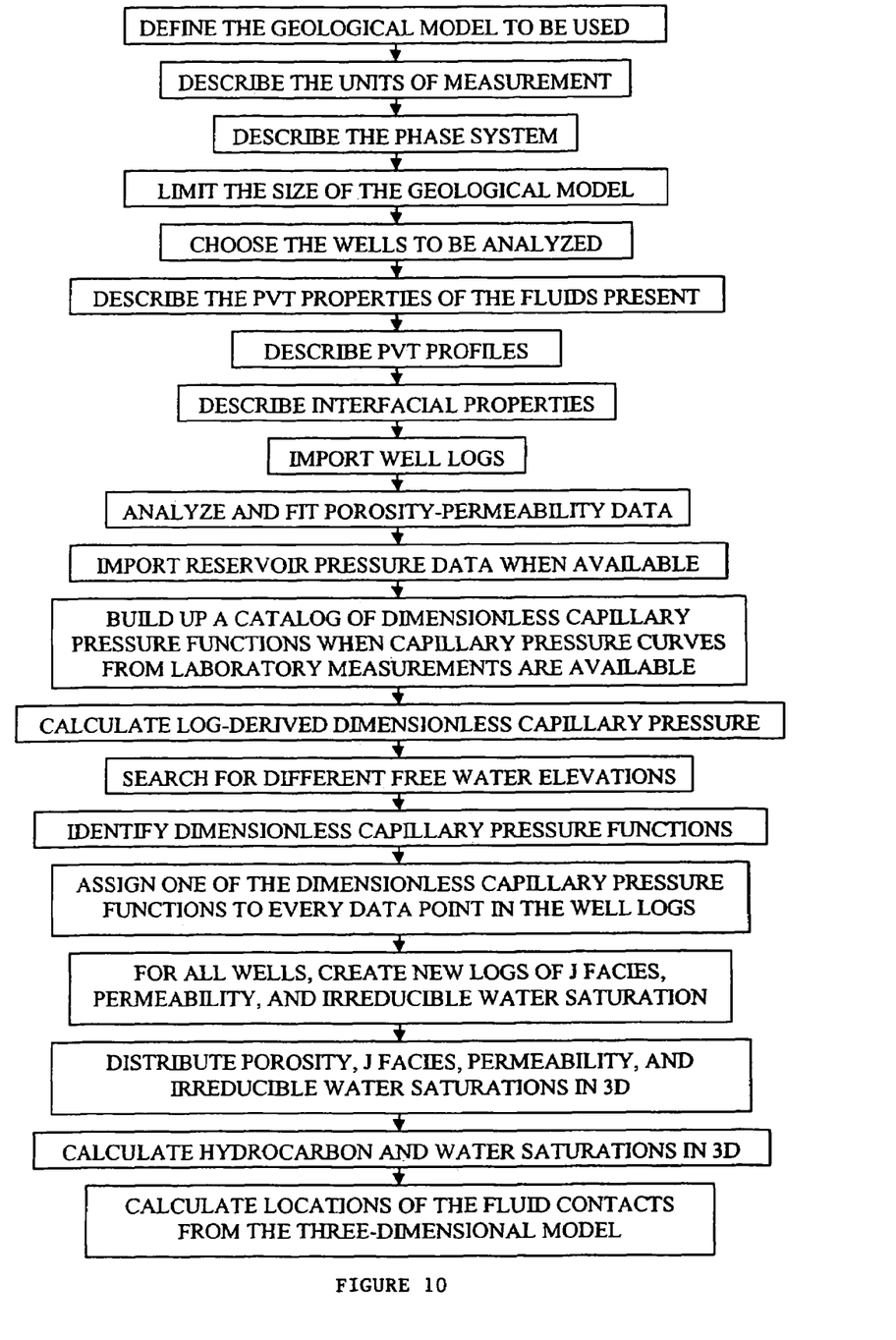
FIG. 10 is a flow diagram of an embodiment of the invention.
Figure 11:
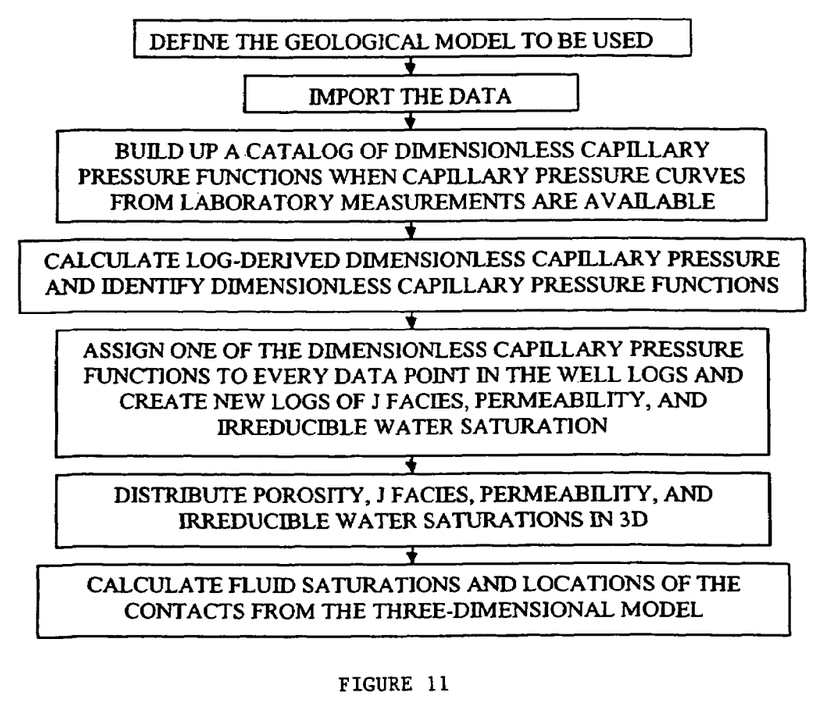
FIG. 11 is a flow diagram of an embodiment of the invention.

From the three-dimensional saturations distributions, calculate the locations of the fluid contacts. See, for example, FIG. 9.

A further preferred embodiment of the current invention and example described above may include the step of identifying dimensionless capillary pressure functions as guided by filtering the dimensionless capillary pressure function data according to geological parameters such as reservoir sequence, zone, fault block, fault segment, or region.

Yet another preferred embodiment of the current invention and example described above may include the step of identifying dimensionless capillary pressure functions as guided by filtering the dimensionless capillary pressure function data according to petrophysical parameters such as shale volume, gamma ray, and seismic impedance.

Another preferred embodiment of the current invention and example described above might include the step of identifying dimensionless capillary pressure functions as guided by filtering the dimensionless capillary pressure function data according to well perforation data.

Still yet another preferred embodiment of the current invention and example described above might include the step of identifying dimensionless capillary pressure functions as guided by filtering the dimensionless capillary pressure function data according to fluid production data.

Yet another preferred embodiment of the current invention and example described above might include the step wherein well logs are quality-controlled according to their conformance with expected characteristic dimensionless capillary pressure functions.

Still another preferred embodiment of the current invention and example described above of said step of estimating the properties and extent of equilibrium regions as constrained by reservoir pressure measurements in oil, water, or gas phases.

Yet another preferred embodiment of the current invention and example described above of said step of estimating permeability may use measurements from logging tools (such as a Nuclear Magnetic Logging).

Also a preferred embodiment of the current invention and example described above of said step of estimating permeability uses laboratory measurements on core samples.

Yet another preferred embodiment of the current invention and example described above of said step of estimating permeability is iterative insofar as it employs porosity-permeability relationships derived from dimensionless capillary pressure function analysis as previously described.

Another preferred embodiment of the current invention and example described above of said step of interpolating porosity, permeability, and J facies into the inter-well region further involves geostatistical methods, such as kriging and co-kriging.

A preferred embodiment of the current invention and example described above of said steps of identifying dimensionless capillary pressure functions and calculating J facies are further used to check the consistency of the well log data and their underlying petrophysical models.

While another preferred embodiment of the current invention and example described above of said step of calculating J facies in the inter-well region is used to check the consistency of the geological model.

Yet another preferred embodiment of current invention and example described above further includes the step of estimating hydrocarbon volumes as used to check consistency of other methods, such as material balance, for estimating such volumes.

It is understood that the invention contemplates using porosity and saturation logs to construct a dimensionless capillary pressure function (DCPF) to search for reservoir compartments and rock types before a geological model has been built. Such a search is important for estimating the complexity of geological description. The permeability component of the DCPF can be obtained via analytical equations, such as but not limited to the Kozeny equation, where permeability is equal to a constant multiplied by porosity raised to a power, via laboratory-derived correlations, or via permeability logs. It is contemplated to search for characteristic shapes of dimensionless capillary pressure functions that indicate compartments or rock types. Generally, the point at which the DCPF equals zero indicates a compartment and the shape of the DCPF indicates lithology or rock type.

It is understood that the term free water surface or surfaces may take into account the possibility that the points at which the capillary pressure is equal to zero may constitute a curved surface rather than a horizontal plane. This may anticipate the cases where over geological time there is a continual flow in the aquifer region underlying the hydrocarbons. In cases, the water pressure is higher in the direction in which flow emanates and is lower in the direction of flow; consequently, the free water surface is at higher elevations in the former region and lower elevations in the latter.

In a preferred embodiment, the invention may comprise a method to use porosity and water saturation logs from one or more wells to construct dimensionless capillary pressure functions for the purposes of indicating or identifying reservoir compartments, rock types or lithologies, generally comprising, featuring or having the following steps. It is understood that the invention is not limited to the same.

A preferred step is constructing a permeability log via analytical equations, laboratory-derived correlations, or measured permeability logs.

A preferred step is estimating fluid densities for reservoir fluids. It is contemplated that the reservoir fluids may be oil, water, gas, and combinations thereof.

A preferred step is estimating interfacial tension and contact angle.

A preferred step is calculating the dimensionless capillary pressure functions as a function of measured water saturation for well log data from measurements of porosity and elevation, and from estimates of interfacial tension, contact angle, and permeability as a function of porosity.

A preferred step is estimating the shape and extent of free water surfaces, for which the capillary pressure is zero.

A preferred step is modifying or adding to shapes of the free water surfaces to identify reservoir compartments. A preferred step is identifying rock types or lithologies through differences in the shapes of the dimensionless capillary pressure functions.

It is further contemplated the above method and step of estimating the position of the free water surface is constrained by reservoir pressure measurements.

It is still further contemplated that the above method and steps of identifying dimensionless capillary pressure functions are used to check the consistency of the well log data and their underlying petrophysical models.

In another preferred embodiment, the invention may comprise a method to use porosity and water saturation logs from one of more wells to construct dimensionless capillary pressure functions for the purposes of indicating or identifying reservoir compartments, comprising, featuring or having the following steps. It is understood that the invention is not limited to the same.

A preferred step is constructing a permeability log via analytical equations, laboratory-derived correlations, or measured permeability logs.

A preferred step is estimating fluid densities for reservoir fluids. It is contemplated that the reservoir fluids may be oil, water, gas, and combinations thereof.

A preferred step is estimating interfacial tension and contact angle.

A preferred step is calculating the dimensionless capillary pressure functions as a function of measured water saturation for well log data from measurements of porosity and elevation, and from estimates of interfacial tension, contact angle, and permeability as a function of porosity.

A preferred step is estimating the shape and extent of free water surfaces, for which the capillary pressure is zero.

A preferred step is modifying or adding to shapes of the free water surfaces to identify reservoir compartments.

In a preferred embodiment, the invention may comprise a method to use porosity and water saturation logs from one or more wells to construct dimensionless capillary pressure functions for the purposes of indicating or identifying reservoir compartments as functions of reservoir sequences (a sequence is defined as a unique combination of reservoir zone and reservoir fault block) generally comprising, featuring or having the following steps. It is understood that the invention is not limited to the same.

A preferred step is constructing a permeability log via analytical equations, laboratory-derived correlations, or measured permeability logs.

A preferred step is estimating fluid densities for reservoir fluids. It is contemplated that the reservoir fluids may be oil, water, gas, and combinations thereof.

A preferred step is estimating interfacial tension and contact angle.

A preferred step is calculating the dimensionless capillary pressure functions as a function of measured water saturation for well log data from measurements of porosity and elevation, and from estimates of interfacial tension, contact angle, and permeability as a function of porosity.

A preferred step is estimating the shape and extent of free water surfaces, for which the capillary pressure is zero, as a function of reservoir sequence.

A preferred step is modifying or adding to shapes of the free water surfaces to identify reservoir compartments as a function of reservoir sequence.

It is further contemplated the above method and step of determining reservoir sequences needed for describing the number of free water surfaces is used to check the consistency of the geological model.

In a preferred embodiment, the invention may comprise a method to use porosity and water saturation logs from one or more wells to construct dimensionless capillary pressure functions for the purposes of improving estimates of reservoir permeability, generally comprising, featuring or having the following steps. It is understood that the invention is not limited to the same.

A preferred step is estimating a permeability log via analytical equations, laboratory-derived correlations, or measured permeability logs.

A preferred step is estimating fluid densities for reservoir fluids. It is contemplated that the reservoir fluids may be oil, water, gas, and combinations thereof.

A preferred step is estimating interfacial tension and contact angle.

A preferred step is calculating the dimensionless capillary pressure functions as a function of measured water saturation for well log data from measurements of porosity and elevation, and from estimates of interfacial tension, contact angle, and permeability as a function of porosity.

A preferred step is estimating the shape and extent of free water surfaces, for which the capillary pressure is zero.

A preferred step is modifying permeability logs to obtain shapes of dimensionless capillary pressure functions that replicate or nearly replicate shapes obtained in laboratory measurements on cores or shapes obtained in analogue reservoirs.

Whereas, the present invention has been shown and described, it should be understood that other and further modifications, apart from those shown or suggested herein, might be made within the spirit and scope of this invention.

What is claimed is:

1. A method to use porosity and water saturation logs from one of more wells to construct dimensionless capillary pressure functions for the purposes of indicating or identifying reservoir compartments, rock types or lithologies, comprising:

constructing a permeability log via analytical equations, laboratory-derived correlations, or measured permeability logs;

estimating fluid densities for reservoir fluids;

estimating interfacial tension and contact angle;

calculating the dimensionless capillary pressure functions as a function of measured water saturation for well log data from measurements of porosity and elevation, and from estimates of interfacial tension, contact angle, and permeability as a function of porosity;

estimating the shape and extent of free water surfaces, for which the capillary pressure is zero;

modifying or adding to shapes of the free water surfaces to identify reservoir compartments; and identifying rock types or lithologies through differences in the shapes of the dimensionless capillary pressure functions.

2. The method in accordance with claim 1 wherein said step of estimating the position of the free water surface is constrained by reservoir pressure measurements.

3. The method in accordance with claim 1 wherein said steps of identifying dimensionless capillary pressure functions are used to check the consistency of the well log data and their underlying petrophysical models.

4. A method to use porosity and water saturation logs from one of more wells to construct dimensionless capillary pressure functions for the purposes of indicating or identifying reservoir compartments comprising:

constructing a permeability log via analytical equations, laboratory-derived correlations, or measured permeability logs;

estimating fluid densities for reservoir fluids;

estimating interfacial tension and contact angle;

calculating the dimensionless capillary pressure functions as a function of measured water saturation for well log data from measurements of porosity and elevation, and from estimates of interfacial tension, contact angle, and permeability as a function of porosity;

estimating the shape and extent of free water surfaces, for which the capillary pressure is zero; and modifying or adding to shapes of the free water surfaces to identify reservoir compartments.

5. A method to use porosity and water saturation logs from one or more wells to construct dimensionless capillary pressure functions for the purposes of indicating or identifying reservoir compartments as functions of reservoir sequences, wherein a sequence is defined as a unique combination of reservoir zone and reservoir fault block, comprising:

constructing a permeability log via analytical equations, laboratory-derived correlations, or measured permeability logs;

estimating fluid densities for reservoir fluids;

estimating interfacial tension and contact angle;

calculating the dimensionless capillary pressure functions as a function of measured water saturation for well log data from measurements of porosity and elevation, and from estimates of interfacial tension, contact angle, and permeability as a function of porosity;

estimating the shape and extent of free water surfaces, for which the capillary pressure is zero, as a function of reservoir sequence; and modifying or adding to shapes of the free water surfaces to identify reservoir compartments as a function of reservoir sequence.

6. The method in accordance with claim 5 wherein said step of determining reservoir sequences needed for describing the number of free water surfaces is used to check the consistency of the geological model.

7. A method to use porosity and water saturation logs from one or more wells to construct dimensionless capillary pressure functions for the purposes of improving estimates of reservoir permeability, comprising:

estimating a permeability log via analytical equations, laboratory-derived correlations, or measured permeability logs;

estimating fluid densities for reservoir fluids;

estimating interfacial tension and contact angle;

calculating the dimensionless capillary pressure functions as a function of measured water saturation for well log data from measurements of porosity and elevation, and from estimates of interfacial tension, contact angle, and permeability as a function of porosity;

estimating the shape and extent of free water surfaces, for which the capillary pressure is zero; and modifying permeability logs to obtain shapes of dimensionless capillary pressure functions that replicate or nearly replicate shapes obtained in laboratory measurements on cores or shapes obtained in analogue reservoirs.

\* \* \* \* \*